(12) United States Patent
NakaMats (10) Patent No.: US 11,754,368 B2
(45) Date of Patent: Sep. 12, 2023

(54) LOW COST ROCKET

(71) Applicant: Yoshiro NakaMats, Tokyo (JP)

(72) Inventor: Yoshiro NakaMats, Tokyo (JP)

( * ) Notice: Subject to any disclaimer, the term of this patent is extended or adjusted under 35 U.S.C. 154(b) by 81 days.

(21) Appl. No.: 17/208,078

(22) Filed: Mar. 22, 2021

(65) Prior Publication Data
US 2021/0372291 A1 Dec. 2, 2021

Related U.S. Application Data

(60) Provisional application No. 63/100,766, filed on Mar. 31, 2020.

(51) Int. Cl.
*F41F 3/04* (2006.01)
*B64G 1/62* (2006.01)

(52) U.S. Cl.
CPC . *F41F 3/04* (2013.01); *B64G 1/62* (2013.01)

(58) Field of Classification Search
None
See application file for complete search history.

(56) References Cited

U.S. PATENT DOCUMENTS 3,007,372 A * 11/1961 Baxter .................. F41F 3/04
244/17.11
2020/0262590 A1* 8/2020 Gentry .................. B64G 1/62

FOREIGN PATENT DOCUMENTS

EP 3650358 A1 * 5/2020 ............. B64G 1/002

\* cited by examiner

*Primary Examiner* — Reginald S Tillman, Jr.
(74) *Attorney, Agent, or Firm* — Wenderoth, Lind & Ponack, L.L.P.

(57) ABSTRACT

A low-cost rocket includes an atmospheric flight part and an exo-atmospheric flight part, and uses the atmospheric air part to ascend into the atmosphere through the use of propellers for the atmospheric portion of the flight. The atmospheric flight part separates from the exo-atmospheric flight part in the vicinity of the exo-atmosphere and the exo-atmospheric rocket is launched thereupon. The atmospheric flight part descends through the atmosphere using autorotation of the propellers and, if necessary, a soft landing can be affected by controlling the pitch of the propellers just prior to landing.

8 Claims, 7 Drawing Sheets

LOW COST ROCKET

TECHNICAL FIELD

This invention relates to a low-cost rocket that significantly reduces costs in comparison with conventional rockets and reusable rockets.

PRIOR ART

In recent years, unmanned and manned rockets, as well as cost-reducing reusable rockets have been launched for space research, observation, and development such as the moon and Mars.

Figure 1:
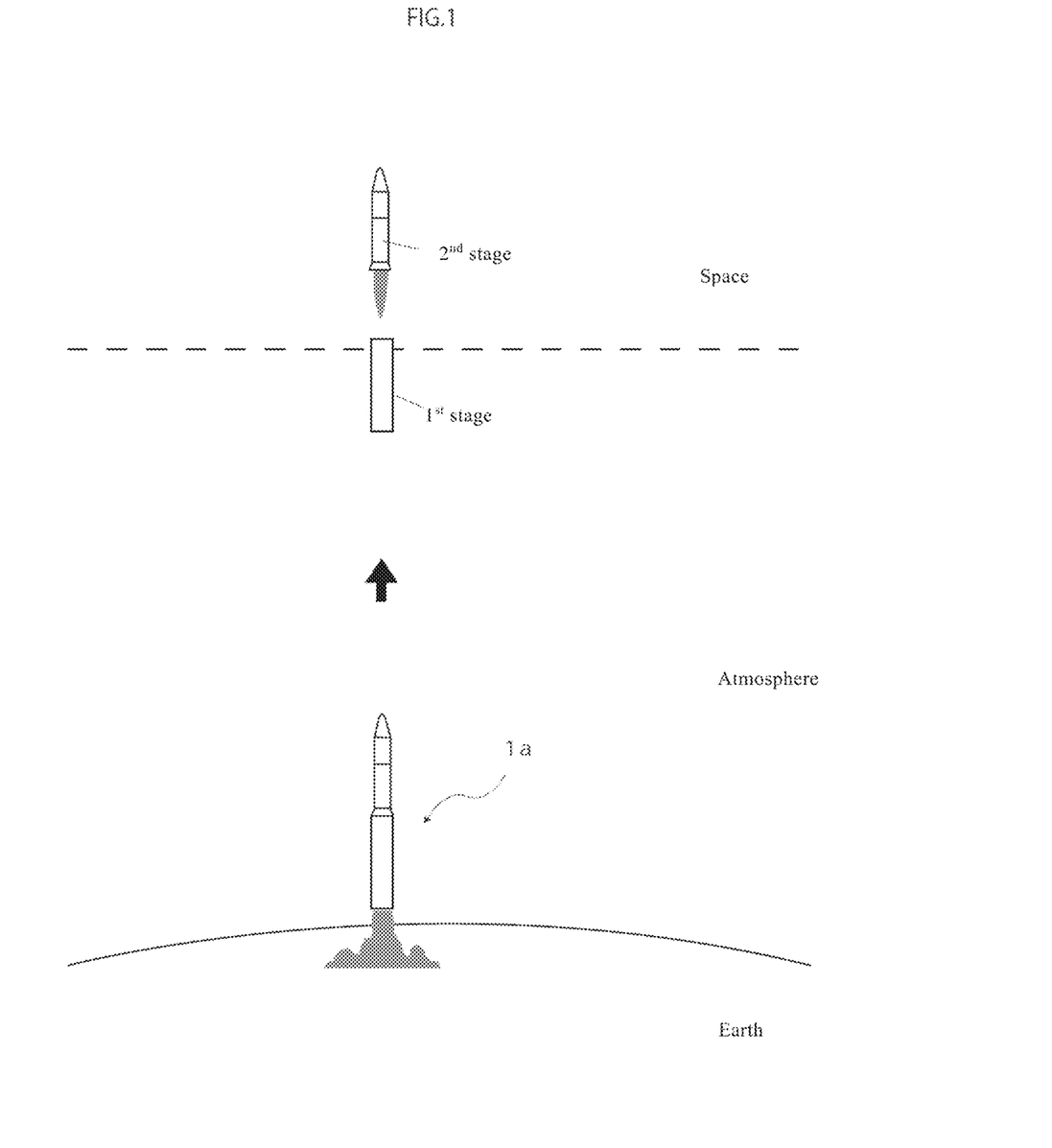
FIG. 1 is a diagram of a disposable multistage rocket.
Figure 2:
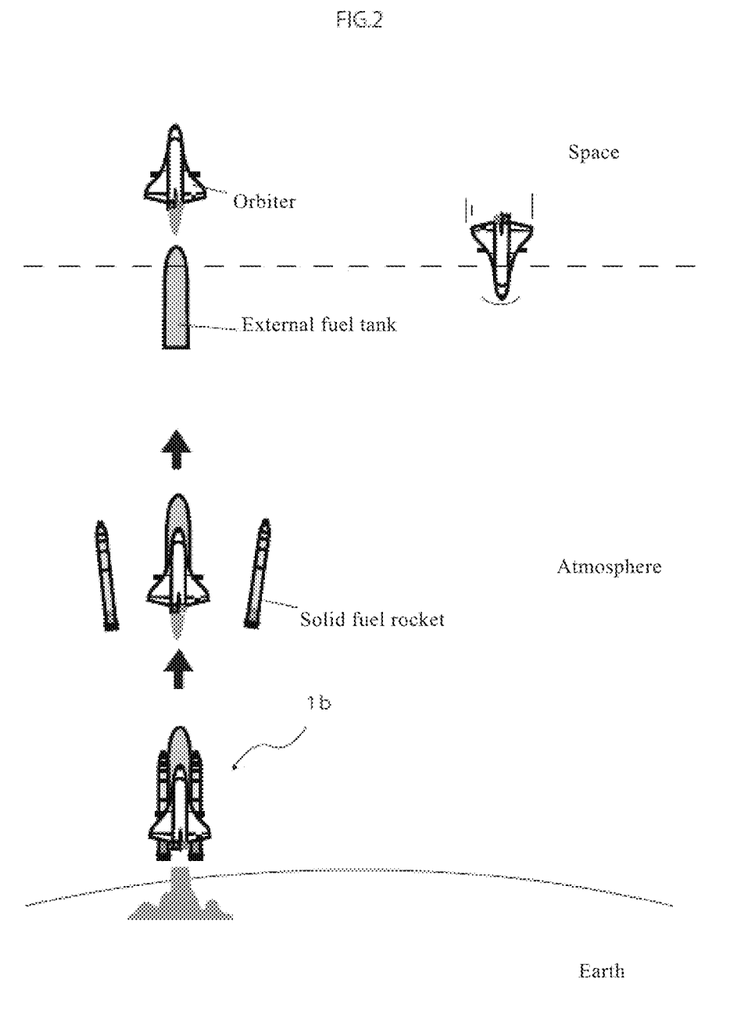
FIG. 2 is a diagram of the Space Shuttle.
Figure 3:
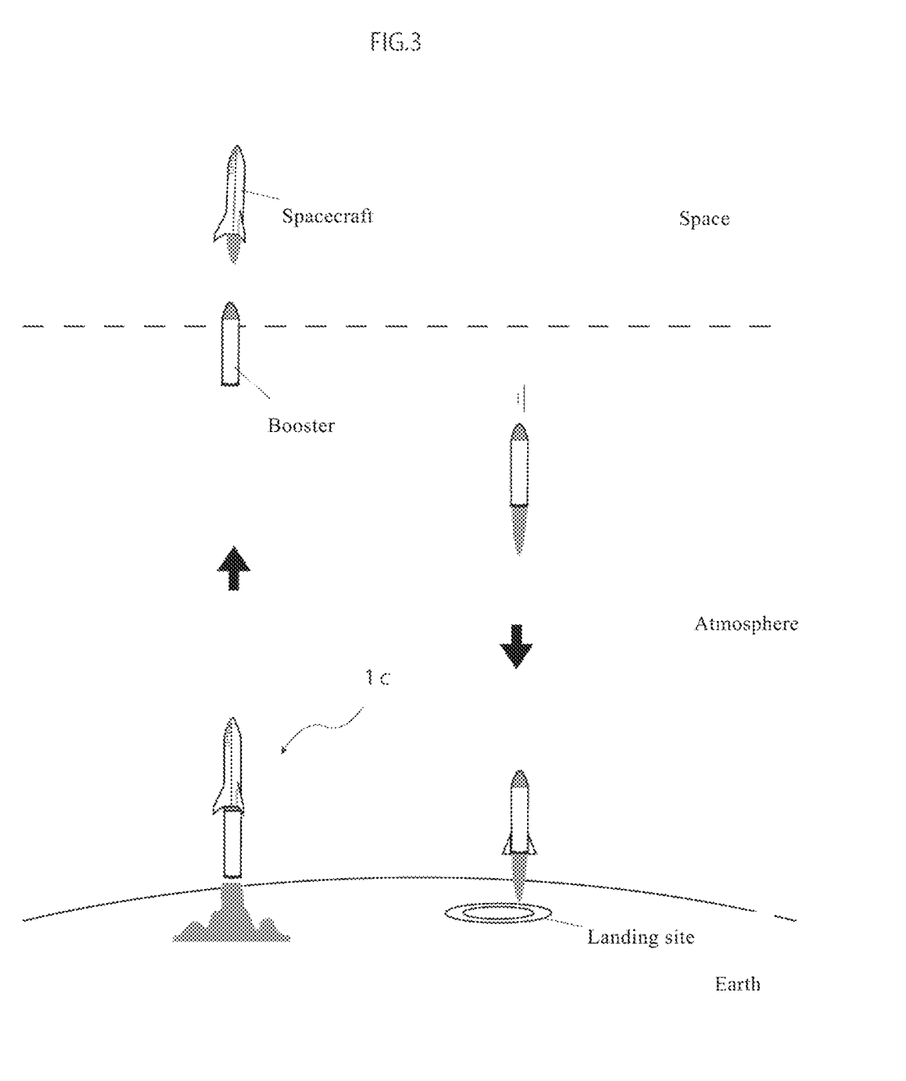
FIG. 3 is a diagram of the Big Falcon Rocket.

FIGS. 1 through 3 show examples of known rockets.

FIG. 1 shows an example of a so-called disposable multistage rocket 1a.

As shown in FIG. 1, the rocket 1a is composed of multiple stages, and is propelled in the atmosphere by an engine which is installed in the first stage, and when the rocket reaches space, which is outside of the atmosphere, the first stage separates and the second stage can be propelled into space by the engines which are installed in the second stage and beyond.

After separation, the first stage falls to earth. The second and subsequent stages as well are similarly not reused.

Therefore, the cost associated with disposable rockets 1a are extremely poor.

Reusable launch vehicle rockets have been developed to resolve these problems associated with disposable rockets.

FIG. 2 shows the Space Shuttle 1b which was developed by the National Aeronautics and Space Administration (NASA). FIG. 3 shows the Big Falcon Rocket (BFR) 1c which was developed by SpaceX.

In these rockets, cost reductions can be anticipated because part or all of the airframe is designed to be reusable.

OUTLINE OF THE INVENTION

Problems to be Solved by the Invention

However, the following problems have been associated with reusable launch vehicle rockets of the prior art.

For example, in the case of the Space Shuttle, although the orbiter is reused, the external fuel tank and solid fuel rockets are disposable (see FIG. 2).

Moreover, the cost of parts that are used and then discarded represents about 80% of the total cost, so the cost-effectiveness of this system is not good.

Additionally, the orbiter must be robustly constructed to avoid damage during reentry into the atmosphere thus increasing the cost of the orbiter still more.

The BFR 1c consists of boosters and a space capsule and is configured so that all of these components are reusable.

For example, the boosters separate from the BFR 1c when the rocket reaches the outer atmosphere. The boosters are designed to land in a vertical position relative to the ground.

However, it is difficult to maintain the long and narrow boosters in a vertical attitude simply by using reverse thrust, and there are concerns about this system's reliability, dependability, and safety.

For the same reason, it is also difficult to land the aircraft accurately at their destination.

Furthermore, such a landing requires advanced control technology, which incurs enormous costs for development and testing.

Therefore, reusable launch vehicle rockets do not necessarily lead to reductions in cost and there is in fact the potential for increased costs.

In addition, conventional rockets consume 80% of their fuel in launch in atmospheric flight.

The present invention was made in view of the above circumstances, and aims to provide a low-cost rocket that can be reused at low cost.

Means of Solving the Problems

To achieve the above purpose, the low-cost rocket consists of an atmospheric flight part and an exo-atmospheric flight part, and uses the atmospheric air part to ascend into the atmosphere through the use of propellers for the atmospheric portion of the flight. The atmospheric flight part separates from the exo-atmospheric flight part in the vicinity of the exo-atmosphere and the exo-atmospheric rocket is launched thereupon. The atmospheric flight part descends through the atmosphere using autorotation of the propellers and, if necessary, a soft landing can be affected by controlling the pitch of the propellers just prior to landing.

Note that the atmospheric flight part is provided with a plurality of propellers which are positioned with their legs spread widely to facilitate lifting the exo-atmospheric flight part vertically, launching and separating it vertically or at a predetermined angle, and the atmospheric part can descend and land virtually horizontally.

Effect of the Invention

Inasmuch as the present invention uses 80% less fuel than rockets of the prior art, costs are low, the rocket can be compact in size, and the frequency of accidents reduced.

The following embodiment of the present invention is described with reference to the drawings.

Figure 4:
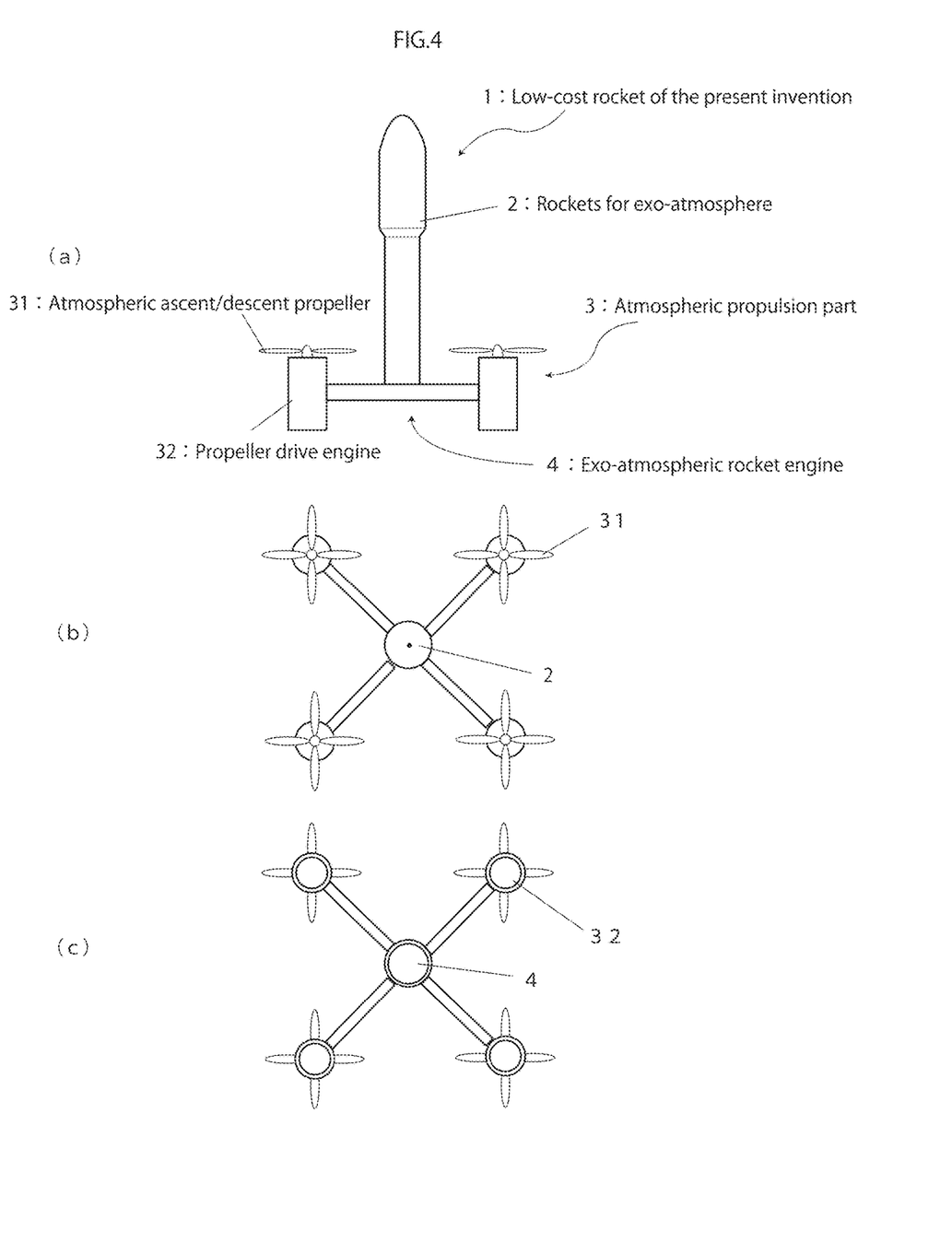
FIG. 4 is an exterior view of the low-cost rocket of the present invention, (a) is a side view, (b) is a plan view, and (c) is a bottom view.

FIG. 4 is an external view of the low-cost rocket of the present invention (hereinafter, rocket 1). (a) is a side view, (b) is a plan view, and (c) is a bottom view.

In this diagram, the rocket 1 is comprised primarily of the rocket body 2 which is the exo-atmospheric flight part, and the atmospheric portion part 3 which is the atmospheric flight part.

The rocket body 2, for example, has a payload compartment at the top and a fuel and rocket engine compartment at the bottom, from which thrust is obtained outside the atmosphere by firing the rocket engine.

A liquid fuel or a solid fuel rocket engine can be used as the rocket engine 4.

The atmospheric portion part 3 is comprised of propellers 31 and the reciprocating engines or turboprop engines 32 that drive them, and this embodiment is illustrated with four pairs of propellers 31 and their drive engines 32.

However, there is no limit to the number of pairs installed, and the atmospheric portion part 3 can consist of a single pair, two pairs, three pairs, or even five or more pairs. The rocket body for exo-atmospheric use 2 and the atmospheric portion part 3 should have thrust sufficient to lift the vehicle to the vicinity of the exo-atmospheric boundary.

Each pair can be independently driven and controlled independently, for example, by radio remote control from a ground station.

The propellers 31 are rotated by the output of a drive engine 32, and the rotation of the propellers provides the thrust for ascent into the atmosphere.

Other engines such as reciprocating engines and turboprop engines, as well as jet engines, rocket engines, or the like can be added to the propeller engines 32.

A turboprop engine is a form of a gas turbine engine that uses most of its output energy to rotate the propeller and can also be provided with jets to add thrust.

Thus, when a turboprop engine is used as the propeller engine 32, the propellers 31 are rotated by the output of the propeller engine 32, and the atmospheric portion part 3 obtains propulsion solely from the rotational force of the propellers 31.

When a jet engine or a rocket engine is used as the engine 32 in part or in full, propulsion can be obtained by either or both of the engines 32 and the propellers 31.

Figure 5:
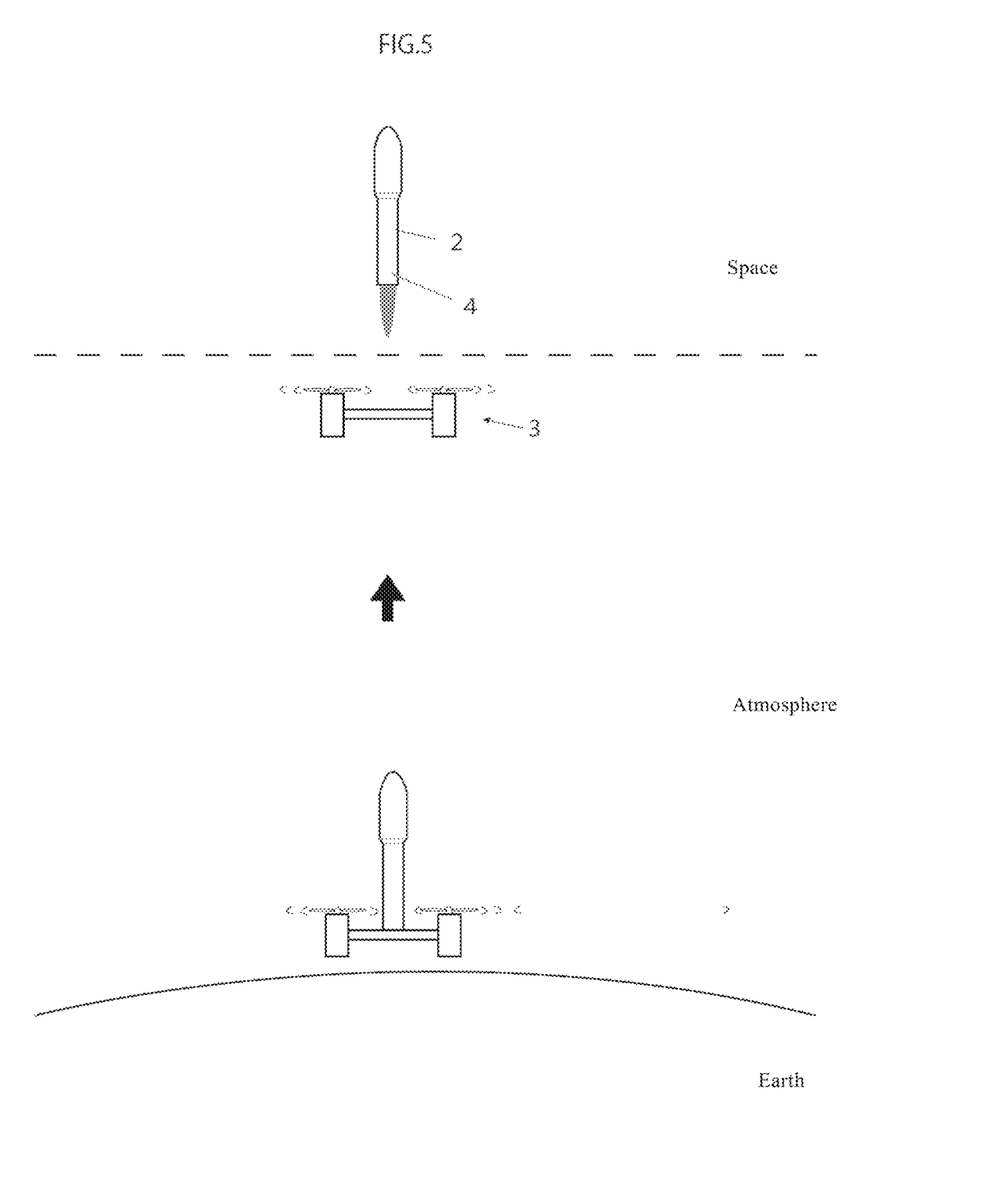
FIG. 5 is a diagram illustrating the operation of the low-cost rocket of the present invention at time of launch and ascent.

As shown in FIG. 5, the low-cost rocket of the present invention 1 ascends using the propulsion of the atmospheric portion part from launch from the ground until it reaches space (in other words, the portion within the atmosphere), and in the vicinity of the exo-atmosphere, the atmospheric portion part 3 is jettisoned from the rocket body 2.

Subsequently, the rocket body 2 flies in the exo-atmosphere, which is to say in space, using the propulsion of the rocket engine 4.

Figure 6:
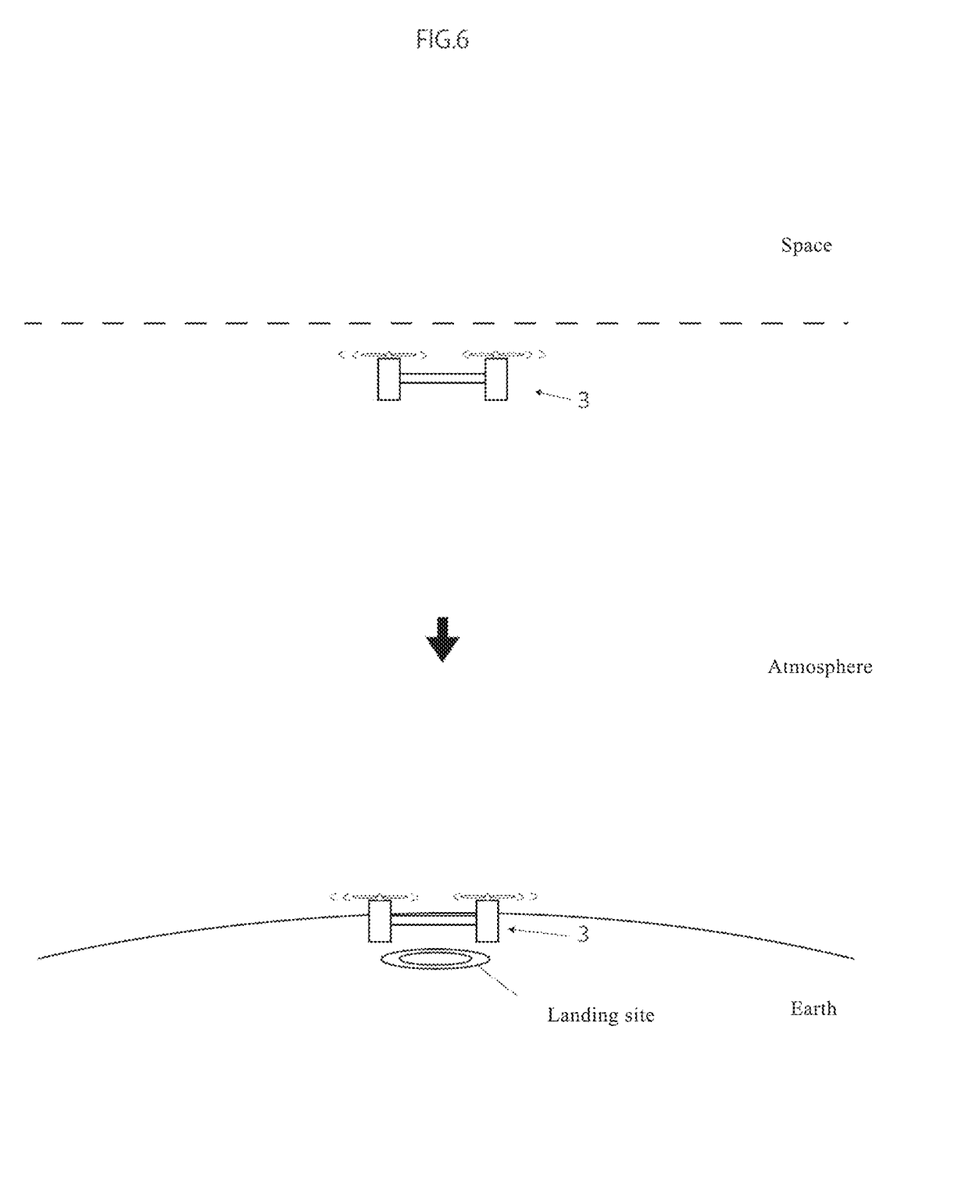
FIG. 6 is a diagram illustrating the operation of the low-cost rocket of the present invention at time of landing.

On the other hand, as shown in FIG. 6, the atmospheric propulsion part 3 loses the rocket body 2, which descends through the atmosphere using air and propellers to land at a predetermined landing site (e.g., the original launch site or other landing site).

The descent of the atmospheric propulsion part 3 in the atmosphere can be achieved, for example, by maintaining the rotation of the propellers 31 below a certain RPM.

Moreover, the propellers 31 can be detached from the engine and rotated (spun) by means of the air passing through the propellers 31 from the bottom to the top, thus permitting the atmospheric propulsion part 3 to descend and land by means of autorotation.

Increasing the length and width of the propellers increases the their upward thrust and lift during autorotation. As shown in FIGS. 4, 5, and 6, the propeller and engine are placed in the atmospheric propulsion section with the legs fully extended around the rocket body 2. The propellers and engines are disposed in the atmospheric propulsion part as shown in FIGS. 4, 5, and 6, so that the propulsion part does not tilt and can ascend or descend stably. Autorotation allows the atmospheric propulsion part to descend and land gently while generating a constant lifting force.

Moreover, the atmospheric propulsion part 3 can be landed on earth by means of autorotation without consuming fuel.

Also, in the event of a malfunction, the atmospheric portion part 3 can descend and land by means of autorotation. When descending by autorotation, the propeller pitch can be varied using correcting levers to increase the lift to facilitate a soft landing near the ground.

The rocket 1 consists of the rocket body 2 and the atmospheric propulsion part 3 with a cost ratio of 80%:20%.

This allows 80% of the airframe to be reused, thus greatly reducing the cost of the rocket 1.

The landing site of the atmospheric propulsion part 3 can also be controlled by pitch control of the individual propellers' 31 RPM.

Thus, the atmospheric propulsion part 3 can be accurately landed at a predetermined landing site.

In addition, the reusable atmospheric propulsion part 3 will not be damaged by re-entry because it does not re-enter the atmosphere at high speed from space, and thus there is no need to incur costs to strengthen the body.

In addition, the low-cost rocket has many advantages, such as cost reduction, almost no fuel-related accidents, a smaller form factor, weight reduction, and ease of transport since the fuel required for ground launch and atmospheric flight is greatly reduced.

Figure 7:
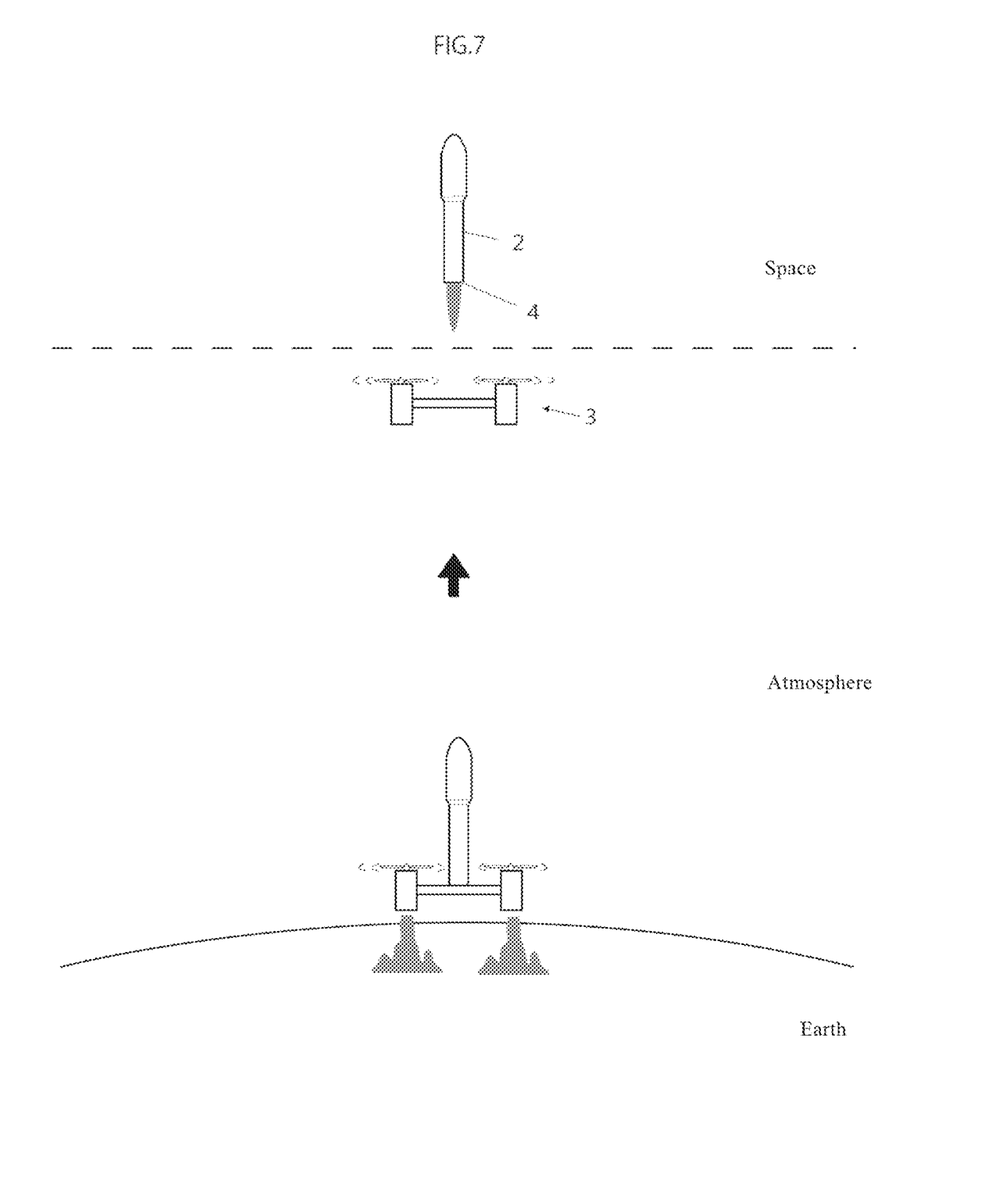
FIG. 7 is a diagram illustrating another embodiment of the low-cost of the present invention at time of launch.

FIG. 7 shows the operation of the rocket 1 during launch and ascent when a jet engine or a rocket engine is used together as the engine 32.

In this case, too, the rocket 1 ascends into space by the propulsion of the atmospheric propulsion part 3 in the atmosphere from ground launch to space, whereupon the rocket body 2 separates from the atmospheric propulsion part 3 in the exo-atmosphere.

Specifically, the rocket 1 can ascend using one or both of the propulsive force of the engine part 32 and the propulsive force of the propellers 31.

When jet engines are rocket engines are employed in the atmospheric propulsion part 3 and the propellers are not used during the ascent phase, the propellers are pitched so as not to be aerodynamic until the atmospheric propulsion part 3 and the rocket body 2 are fired and separated, thereby reducing air resistance from the propellers during ascent. When descending, the propeller pitch is controlled by autorotation in the air, and the downward thrust of the jet or rocket engines may be used for descent.

Moreover, the present invention includes the use of the engines to rotate the propellers to affect a landing without the use of autorotation.

The "autorotation" referred to in the specification of the present invention will be explained precisely since as the inventor is the chair of the University of Tokyo's AV Using Research Association and the holder of a new record for a flight around Japan by helicopter.

"Autorotation" is an essential element of helicopter operation and is always the last step in a helicopter pilot's qualification examination. It is a method of maneuvering an aircraft to land safely on the ground without driving the rotor (propellers) in the event of an accident in which the engine stops in flight.

Specifically, the aircraft descends by disengaging the engine and rotor (propeller) clutch, thus permitting the rotor (propeller) to spin freely. Near the ground just before landing, the correcting pitch lever (the right-hand control stick) is raised to increase rotor (propeller) pitch to increase lift in order to affect a soft landing. The present invention uses a manual or wireless method. In this invention, the length, width, number, and arrangement of propellers shall be appropriate for "autorotation."

Although "autorotation" [in Japanese] translates literally to "rotating automatically" [in English], "autorotation" does not mean "rotating automatically." In other words, even if the turbine blades of a jet engine are rotated by means of the air, this is not "autorotation." Thus, "autorotation" is not possible in a jet engine.

As described above, the rocket 1 of the present invention consists of an atmospheric flight part with an atmospheric propulsion part 3 and an exo-atmospheric flight part having a rocket body 2. The atmospheric flight part ascends in the atmosphere using air by means of the propellers of the atmospheric flight part, separates from the exo-atmospheric flight part, which is launched into space by the rocket 4, and the exo-atmospheric flight part descends and lands by means of autorotation of the propeller in air.

Thus, in the atmosphere in which air is present, the vehicle ascends and descends using propellers, etc., and outside of the atmosphere (in space) in the absence of air, the vehicle moves using rocket engines, etc., to efficiently obtain propulsive force, in this way eliminating the need for atmospheric flight rocket fuel and allowing the atmospheric flight portion to be used many times.

Moreover, there is a significant reduction in the weight, cost, and accidents of ground-launching an atmospheric flight of the rocket body 2. Also, since the rocket body does not need to reenter the atmosphere, a significant reduction in rocket 1 costs can be achieved because there is no need for heat-resistant parts and no risk of damage due to reentry. Also, there are significant cost reductions in launch costs because there would be virtually no launch problems.

INDUSTRIAL APPLICABILITY

The present invention will significantly reduce the cost of rockets and their launches compared to every other conventional method, and will contribute dramatically to improvements in the aerospace industry.

EXPLANATION OF SYMBOLS

1 Low-cost rocket of the present invention
2 Rockets for exo-atmosphere
3 Atmospheric propulsion part
31 Atmospheric ascent/descent propeller
32 Propeller drive engine
4 Exo-atmospheric rocket engine

The invention claimed is:

1. A low-cost rocket separately utilizing an atmosphere and an exo-atmosphere, comprising:

an atmospheric flight part configured to control ascent of the low cost rocket in the atmosphere using air and including at least two propeller units configured to control descent of the atmospheric flight part, each propeller unit being configured on an opposite end of the atmospheric flight part with respect to another propeller unit; and an exo-atmospheric flight part provided with a rocket and configured to separate from the atmospheric flight part after reaching the exo-atmosphere and control ascent of the low-cost rocket into the exo-atmospheric by using the rocket, wherein the atmospheric flight part descends and lands on Earth after separation from the exo-atmospheric part using air and propellers of each of the propeller units.

2. The low-cost rocket of claim 1, wherein the atmospheric flight part ascends using the propellers or jet engines which use air without using ground-launched rockets and their fuel.

3. The low-cost rocket of claim 2, wherein the propeller units are disposed in a wide-legged position with respect each other on the of the atmospheric flight part, which allows for ascent, descent, and landing in a stable fashion, and launching of the low-cost rocket vertically or at a predetermined angle into the exo-atmosphere.

4. The low-cost rocket of claim 1, wherein the atmospheric flight part and exo-atmospheric flight part separate in the vicinity of the exo-atmosphere and the low-cost rocket flies in the exo-atmosphere using the rocket, which is an exo-atmospheric rocket.

5. The low-cost rocket of claim 2, wherein, if needed, propeller pitch control is performed on each of the propeller units in the vicinity of the ground of the Earth to control the descent and achieve a safe landing, facilitating repeated reuse of the atmospheric flight part.

6. The low-cost rocket of claim 5, wherein propeller pitch control is performed on each of the propeller units independently from other propeller units of the atmospheric flight part.

7. The low-cost rocket of claim 1, wherein the atmospheric flight part uses the air of the atmosphere for autorotation of the propellers of the propeller units during descent.

8. The low-cost rocket of claim 1, wherein each propeller unit includes a propeller engine for controlling rotation of the propellers.

* * * * *